US009756217B2

(12) United States Patent
Kasuya

(10) Patent No.: US 9,756,217 B2
(45) Date of Patent: Sep. 5, 2017

(54) IMAGE PROCESSING APPARATUS, AN IMAGE PROCESSING METHOD, AND A NON-TRANSITORY STORAGE MEDIUM FOR RECEIVING DATA FROM AN INFORMATION PROCESSING APPARATUS AND EXECUTING PROCESSES

(71) Applicant: CANON KABUSHIKI KAISHA, Tokyo (JP)

(72) Inventor: Kenji Kasuya, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/964,213

(22) Filed: Dec. 9, 2015

(65) Prior Publication Data
US 2016/0173730 A1    Jun. 16, 2016

(30) Foreign Application Priority Data
Dec. 11, 2014    (JP) .................................. 2014-250966

(51) Int. Cl.
*H04N 1/44*    (2006.01)
*H04N 1/00*    (2006.01)
(Continued)

(52) U.S. Cl.
CPC ......... *H04N 1/4413* (2013.01); *G06F 3/1222* (2013.01); *G06F 3/1238* (2013.01);
(Continued)

(58) Field of Classification Search
CPC ...................................................... H04N 1/4413
(Continued)

(56) References Cited

U.S. PATENT DOCUMENTS

2010/0007928 A1\*  1/2010  Kashioka ........... H04N 1/00225
                                                   358/474
2013/0229687 A1\*  9/2013  Yamauchi ............. G06F 3/1204
                                                   358/1.15
(Continued)

FOREIGN PATENT DOCUMENTS

JP         H07288625 A      10/1995

*Primary Examiner* — Jacky X Zheng
(74) *Attorney, Agent, or Firm* — Canon U.S.A., Inc. IP Division

(57) ABSTRACT

An image processing apparatus is provided to receive from an information processing apparatus, a document scan/transmission job for causing the reading unit to read a document to generate image data and transmit the image data to a specified destination, in a case where the document scan/transmission job is received. The image processing apparatus determines whether authentication information of a user of the information processing apparatus and authentication information of a user of the image processing apparatus match each other, in a case where the authentication information of the user of the information processing apparatus and the authentication information of the user of the image processing apparatus match each other, displays a setting screen for receiving a setting regarding execution of the document scan/transmission job, and executes the document scan/transmission job according to an instruction received through the displayed setting screen.

16 Claims, 17 Drawing Sheets

(51) Int. Cl.
*H04N 1/21* (2006.01)
*G06F 3/12* (2006.01)

(52) U.S. Cl.
CPC ....... *G06F 3/1292* (2013.01); *H04N 1/00244* (2013.01); *H04N 1/00411* (2013.01); *H04N 1/2104* (2013.01); *H04N 2201/0094* (2013.01)

(58) Field of Classification Search
USPC .............................................. 358/1.14, 1.15
See application file for complete search history.

(56) References Cited

U.S. PATENT DOCUMENTS

| | | | | |
|---|---|---|---|---|
| 2013/0229690 A1* | 9/2013 | Sumita | ............... | H04N 1/00127 358/1.15 |
| 2013/0335774 A1* | 12/2013 | Kato | ..................... | G06F 3/1296 358/1.15 |
| 2014/0240763 A1* | 8/2014 | Urakawa | ............... | G06F 3/1292 358/1.15 |

* cited by examiner

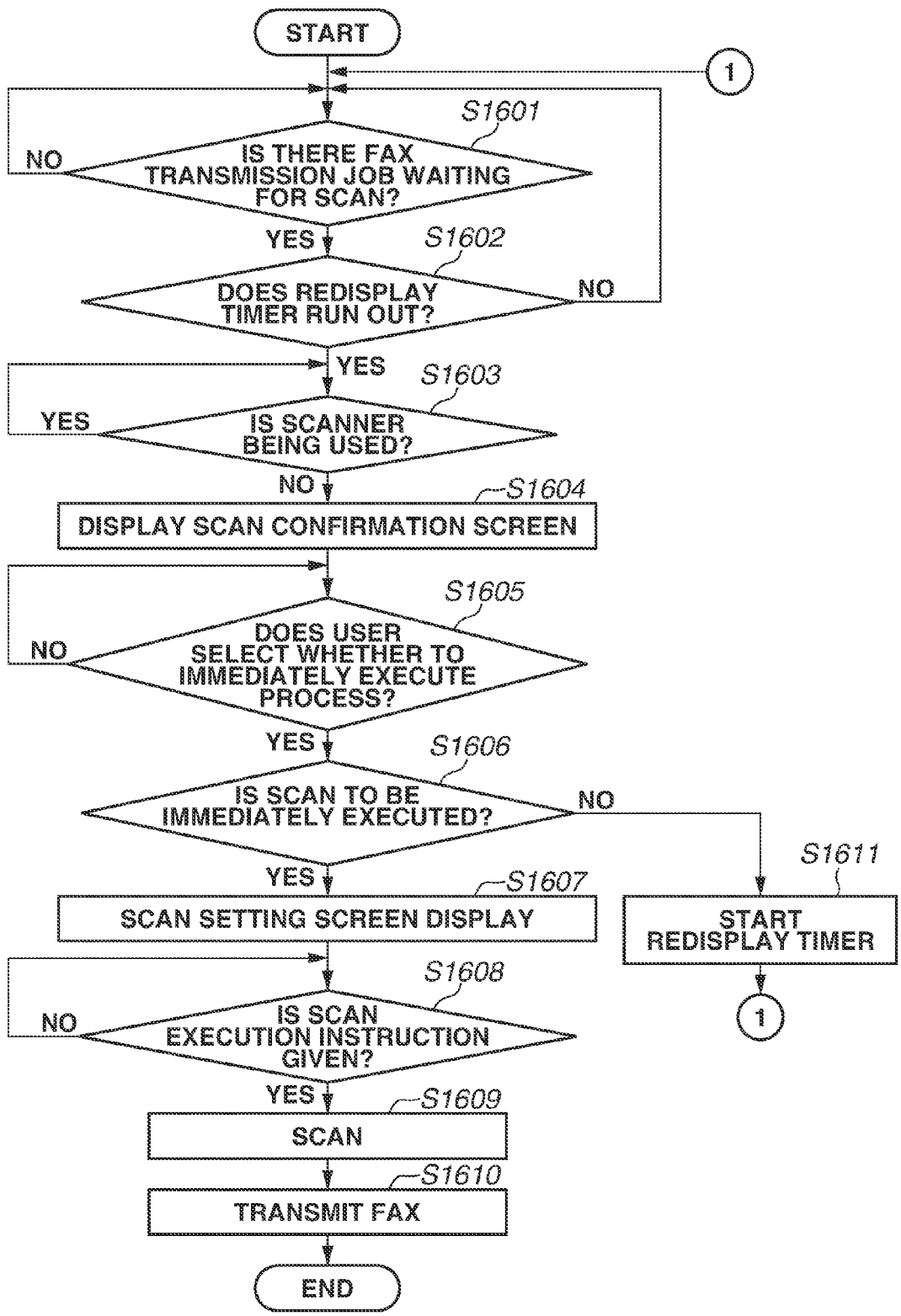

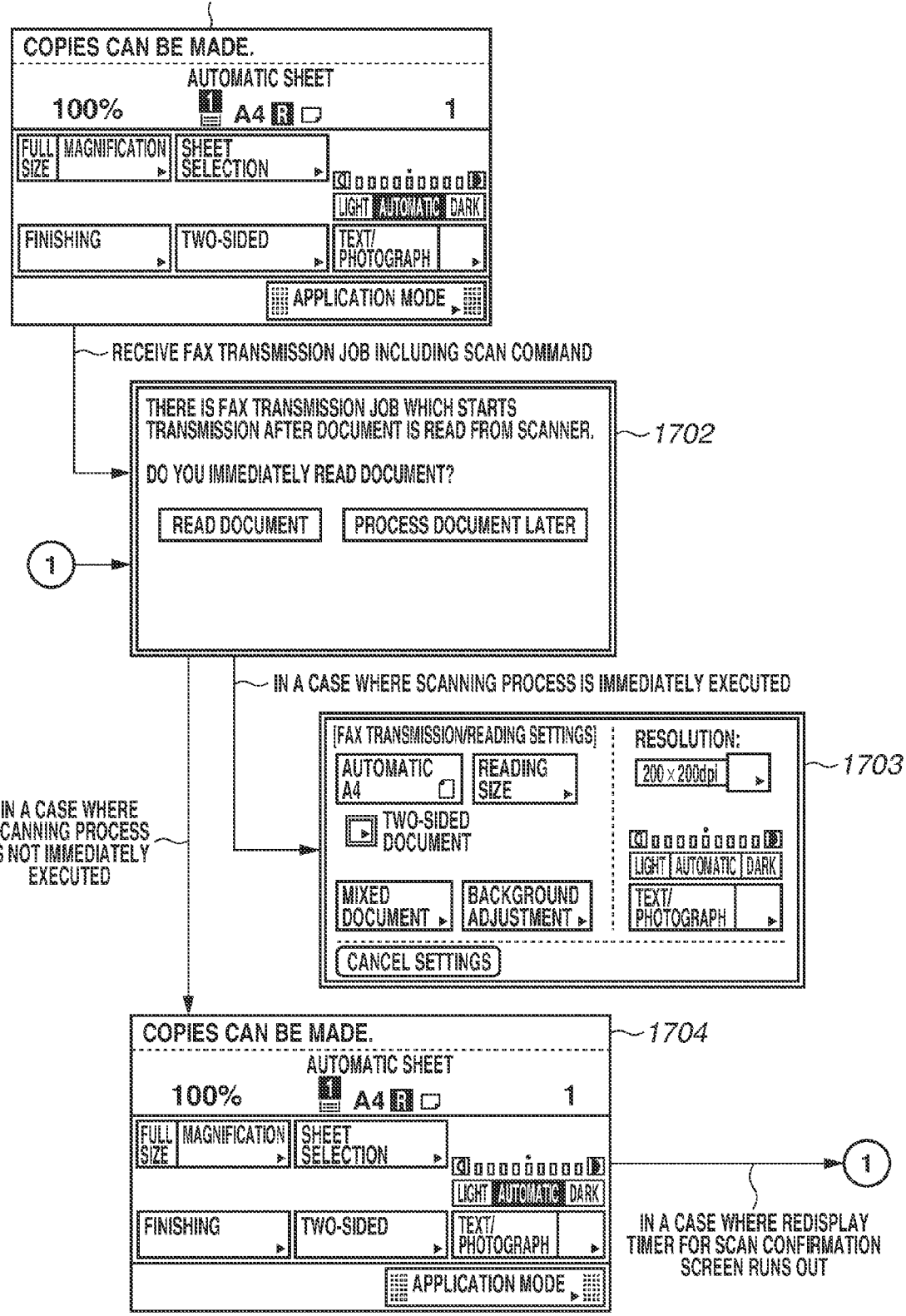

IMAGE PROCESSING APPARATUS, AN IMAGE PROCESSING METHOD, AND A NON-TRANSITORY STORAGE MEDIUM FOR RECEIVING DATA FROM AN INFORMATION PROCESSING APPARATUS AND EXECUTING PROCESSES

BACKGROUND OF THE INVENTION

Field of the Invention

The present invention relates to an image processing apparatus, an image processing method, and a storage medium.

Description of the Related Art

Conventionally, the function of transmitting image data generated by a client computer to a fax apparatus via a local area network (LAN) and transmitting the image data through facsimile processing from the fax apparatus is known. In this case, a user can specify the destination of the fax transmission on the client computer side.

Further, the function of notifying a fax apparatus only of a destination specified by a user without preparing image data on a client computer side, and then transmitting image data generated by reading a document on the fax apparatus side to the specified destination by fax is also known (the publication of Japanese Patent Application Laid-Open No. 7-288625).

In the technique discussed in Japanese Patent Application Laid-Open No. 7-288625, however, while a scanner unit of the fax apparatus is being used, or while the fax apparatus is executing a document scan/transmission job according to an instruction from another client computer, a new document scan/transmission job is not received. That is, in the technique discussed in Japanese Patent Application Laid-Open No. 7-288625, it is determined, based on the state of use of the fax apparatus by another user, whether a new document scan/transmission job can be executed. This is inconvenient for the user.

Further, in the technique discussed in Japanese Patent Application Laid-Open No. 7-288625, if document scan/transmission jobs are received almost simultaneously from different client computers, image data generated by reading a document is transmitted to a destination specified by the first received job. Thus, the image data may be transmitted to a destination not intended by the user, that is, transmitted to a destination specified by a document scan/transmission job instructed by another client computer. This poses a security problem.

SUMMARY OF THE INVENTION

The present invention is directed to providing a mechanism for, even if a plurality of users use an image processing apparatus in a shared manner, certainly executing a document scan/transmission job, regardless of the state of use of the image processing apparatus by another user.

According to an aspect of the present invention, an image processing apparatus for reading a document to generate image data, using a reading unit includes a reception unit configured to receive from, an information processing apparatus capable of communicating with the image processing apparatus via a network, a document scan/transmission job for causing the reading unit to read a document to generate image data and transmitting the image data to a specified destination, a determination unit configured to, in a case where the reception unit receives the document scan/transmission job, determine whether authentication information of a user of the information processing apparatus and authentication information of a user of the image processing apparatus match each other, a setting screen display unit configured to, in a case where the determination unit determines that the authentication information of the user of the information processing apparatus and the authentication information of the user of the image processing apparatus match each other, display a setting screen for receiving a setting regarding execution of the document scan/transmission job, and an execution unit configured to execute the document scan/transmission job according to an instruction received through the setting screen displayed by the setting screen display unit.

Further features of the present invention will become apparent from the following description of exemplary embodiments with reference to the attached drawings.

BRIEF DESCRIPTION OF THE DRAWINGS

FIG. 16 is a flowchart (part 4) illustrating an example of processing of the MFP.

FIG. 17 is a diagram (part 2) illustrating examples of display screens of the MFP.

DESCRIPTION OF THE EMBODIMENTS

With reference to the drawings, the best mode for carrying out the present invention will be described below. The following exemplary embodiments do not limit the present invention with respect to the appended claims, and not all the combinations of the features described in the exemplary embodiments are essential for a method for solving the problems in the present invention.

Figure 1:
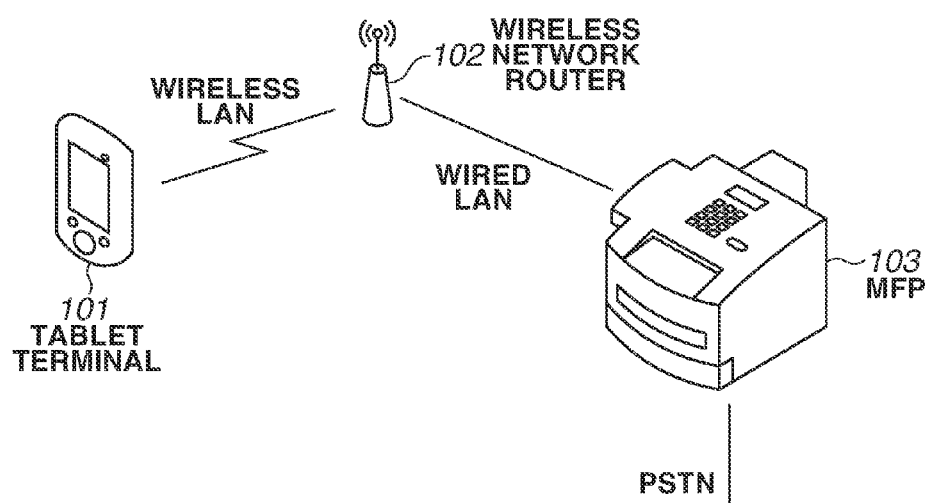
FIG. 1 is a diagram illustrating an example of a system configuration of an image processing system.

A first exemplary embodiment of the present invention is described. FIG. 1 is a diagram illustrating an example of the system configuration of an image processing system according to the present exemplary embodiment. A tablet terminal 101, which is an example of an information processing apparatus, communicates with a multifunction peripheral (MFP) 103 via a wireless network router (wireless access point) 102. The MFP 103 is an example of an image processing apparatus. The tablet terminal 101 and the wireless network router 102 are connected together via a wireless local area network (LAN). The MFP 103 and the wireless network router 102 are connected via a wired LAN. The MFP 103 is also connected to the public switched telephone network (PSTN). The communication path between the tablet terminal 101 and the MFP 103 is not limited to the above. For example, the tablet terminal 101 and the wireless network router 102 may be connected via a wired LAN. Alternatively, the MFP 103 and the wireless network router 102 may be connected via a wireless LAN. Yet alternatively, the tablet terminal 101 and the MFP 103 may be connected to the same network. That is, any configuration may be employed so long as the tablet terminal 101 and the MFP 103 can communicate with each other via a network.

Figure 2:
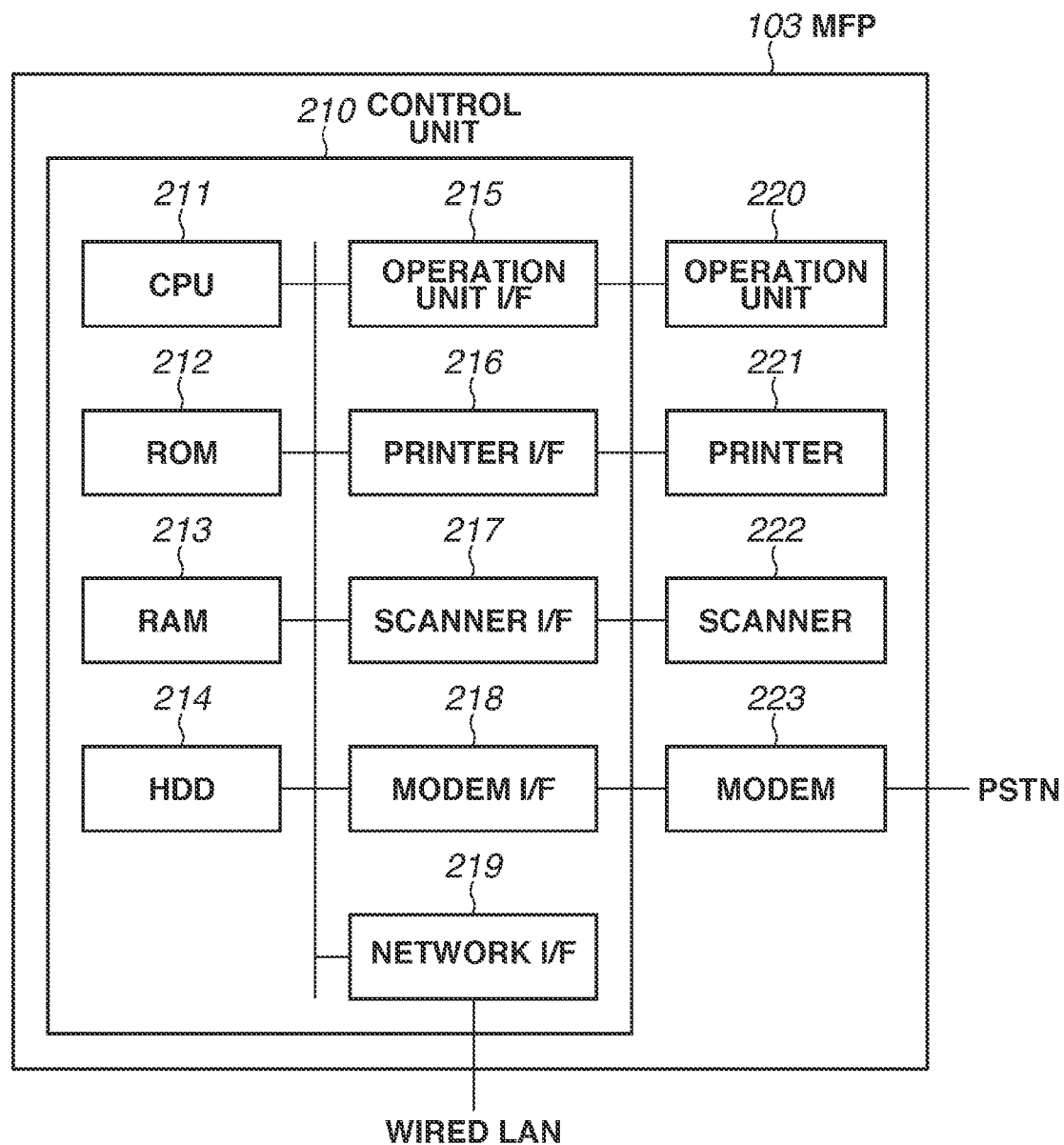
FIG. 2 is a diagram illustrating an example of a hardware configuration of a multifunction peripheral (MFP).

FIG. 2 is a diagram illustrating an example of the hardware configuration of the MFP 103. A control unit 210, which includes a central processing unit (CPU) 211, controls the operation of the entirety of the MFP 103. The CPU 211 reads a control program stored in a read-only memory (ROM) 212 and performs various types of control such as reading, printing, and communication. More specifically, the CPU 211 reads and executes a program stored in the ROM 212, thereby achieving the software configuration of the MFP 103, the processing of the MFP 103 in sequence diagrams, and each process illustrated in flowcharts, which will be described later.

A random-access memory (RAM) 213 is used as temporary storage areas such as a main memory and a work area for the CPU 211. In the MFP 103, a single CPU 211 executes each process illustrated in the flowcharts described later, using a single memory (the RAM 213 or a hard disk drive (HDD) 214). Alternatively, another form may be employed. For example, a plurality of CPUs and a plurality of RAMS or HDDs can also cooperate to execute each process illustrated in the flowcharts.

The HDD 214 stores image data and various programs. The HDD 214 is also used as a storage area for various setting data of the MFP 103. An operation unit interface (I/F) 215 connects an operation unit 220 and the control unit 210. The operation unit 220 includes a liquid crystal display unit having a touch panel function and a keyboard, and functions as a reception unit for receiving an operation, an input, and an instruction from a user.

A printer I/F 216 connects a printer 221 and the control unit 210. Image data to be printed by the printer 221 is transferred from the control unit 210 via the printer I/F 216 and printed on a recording medium by the printer 221.

A scanner I/F 217 connects a scanner 222 and the control unit 210. The scanner 222 reads a document to generate image data and inputs the generated image data to the control unit 210 via the scanner I/F 217.

A modem I/F 218 connects a modem 223 and the control unit 210. The modem 223 is connected to the PSTN and communicates image data with an external fax apparatus (not illustrated) by fax. A network I/F 219 connects the control unit 210 (the MFP 103) to the wired LAN. Using the network I/F 219, the MFP 103 can communicate with an external apparatus and transmit and receive image data and various information to and from the external apparatus.

Figure 3:
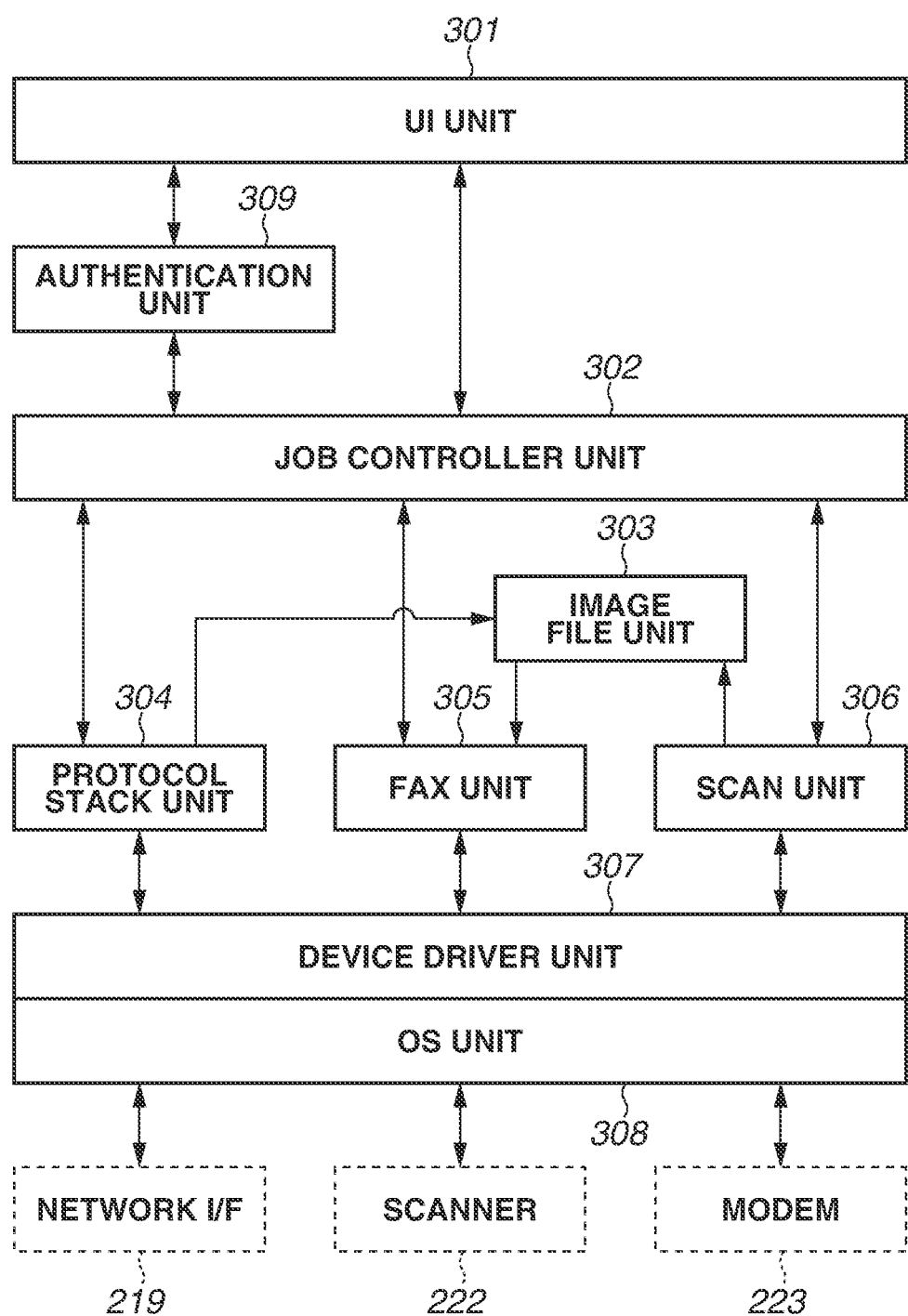
FIG. 3 is a diagram illustrating an example of a software configuration of the MFP.

FIG. 3 is a diagram illustrating an example of the software configuration of the MFP 103. The components indicated by solid lines in FIG. 3 are software modules achieved by the CPU 211 reading and executing a program stored in the ROM 212 or the HDD 214. A user interface (UI) unit 301 provides various information to the user through the operation unit 220 and also receives various instructions from the user through the operation unit 220. A job controller unit 302 receives a copy job, a print job, or a fax job and controls the execution of the received job. A protocol stack unit 304 holds various network protocols such as the Transmission Control Protocol/Internet Protocol (TCP/IP) and the Hypertext Transfer Protocol (HTTP).

In the present exemplary embodiment, image data to be transmitted from the tablet terminal 101 is received via the network I/F 219 according to a network protocol held in the protocol stack unit 304. The received image data is stored in an image file unit 303. The image file unit 303 is a software module for managing image data stored in the RAM 213 or the HDD 214.

The image file unit 303 stores not only image data received via the network I/F 219, but also image data generated by the scanner 222. The generation of image data by the scanner 222 is controlled by a scan unit 306. A fax unit 305 controls fax communication via the modem 223. If the MFP 103 transmits a fax, the fax unit 305 reads and transmits image data stored in the image file unit 303.

An operating system (OS) unit 308 adjusts each module and a task, thereby managing the entirety of the software of the MFP 103. The OS unit 308 is combined with a device driver unit 307. The device driver unit 307 controls hardware devices such as the scanner 222 and the modem 223.

An authentication unit 309 is a module for controlling user authentication. If user authentication is enabled in the MFP 103, the user needs to perform a login operation for inputting authentication information including a user name and a password through the operation unit 220.

The authentication unit 309 checks the input authentication information against authentication information registered in advance, thereby determining whether the user is authenticated. If the user is authenticated, the user can use the MFP 103. If user authentication is disabled in the MFP 103, the user can use the MFP 103 without a login operation and authentication by the authentication unit 309.

Figure 4:
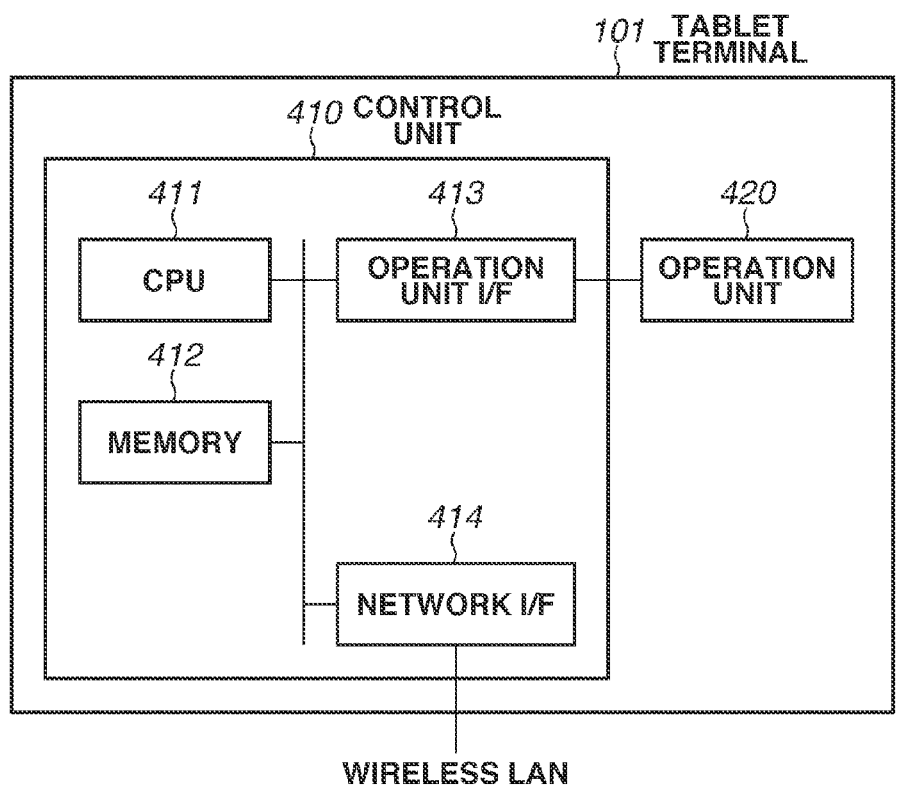
FIG. 4 is a diagram illustrating an example of a hardware configuration of a tablet terminal.

FIG. 4 is a diagram illustrating an example of the hardware configuration of the tablet terminal 101. A control unit 410, which includes a CPU 411, controls the operation of the entirety of the tablet terminal 101. The CPU 411 reads a control program stored in a memory 412 and performs various types of control. More specifically, the CPU 411 reads and executes a program stored in the memory 412, thereby achieving the functions of the tablet terminal 101 and the processing of the tablet terminal 101 in the sequence diagrams described later. The memory 412 is also used as temporary storage areas such as a main memory and a work area for the CPU 411. In the tablet terminal 101, a single CPU 411 executes each process using a single memory 412. Alternatively, another form may be employed. For example, a plurality of CPUs and a plurality of memories can also cooperate to execute each process.

An operation unit I/F 413 connects an operation unit 420 and the control unit 410. The operation unit 420 includes a liquid crystal display unit having a touch panel function, and functions as a reception unit for receiving an operation, an input, and an instruction from the user. A network I/F 414 connects the control unit 410 (the tablet terminal 101) to the wireless LAN. Using the network I/F 414, the tablet terminal 101 can transmit image data and information to an external apparatus and receive various information from the external apparatus.

Figure 5:
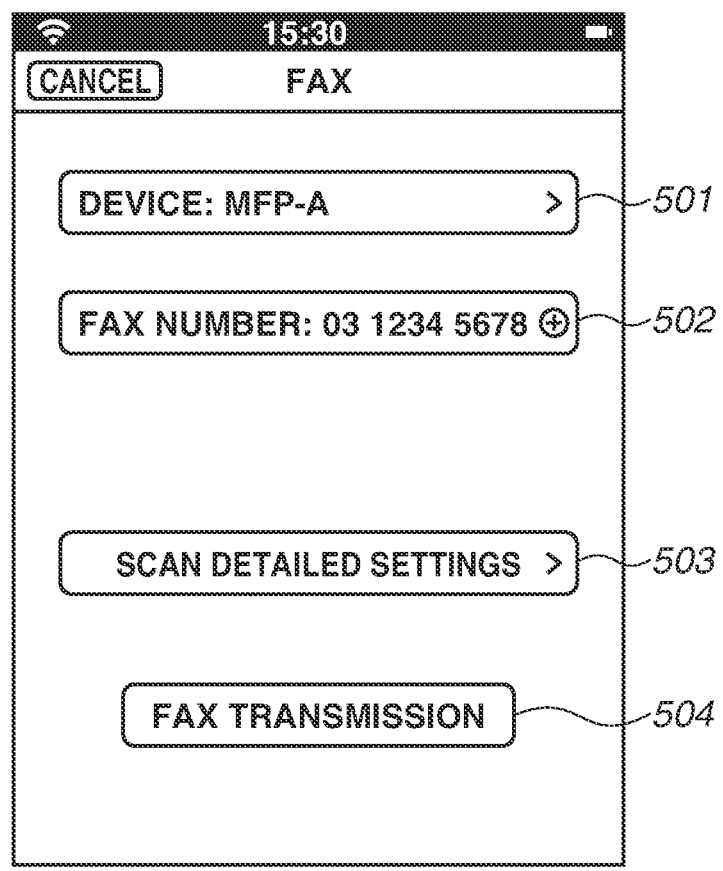
FIG. 5 is a diagram (part 1) illustrating an example of an operation screen of the tablet terminal.

FIG. 5 is a diagram illustrating an example of an operation screen of a fax transmission application displayed on the tablet terminal 101. The fax transmission application is an application that can be downloaded from a server on the Internet and additionally installed on the tablet terminal 101. The fax transmission application is software that operates on an OS unit of the tablet terminal 101. By using the fax transmission application, the tablet terminal 101 side can make a setting for causing the MFP 103 to transmit a fax. The operation of the tablet terminal 101 is executed based on an instruction from the fax transmission application as described below.

If the fax transmission application is started up in the tablet terminal 101, the operation screen illustrated in FIG. 5 is displayed. A setting field 501 is a field for selecting and setting an MFP to transmit a fax. If the user touches the setting field 501, the tablet terminal 101 searches for MFPs present around the tablet terminal 101 and displays a list of the found MFPs. The user can select from among the displayed MFPs an MFP to transmit a fax.

A setting field 502 is a field for setting a telephone number (a fax number) as the destination of the fax transmission. The user may input a telephone number using a software keyboard displayed on the tablet terminal 101, or may select a telephone number with reference to an address book stored in the tablet terminal 101.

A setting field 503 is a field for making detailed settings of a scanning process (a reading process) to be executed using the scanner 222 of the MFP 103. If the user touches the setting field 503, a screen for specifying reading parameters such as the resolution, the image quality, and the document size is displayed. Then, scan settings are received from the user through this screen. If the scanning process is not started yet, the user can change, through the operation unit 220 of the MFP 103, the detailed settings of the scanning process made in the setting field 503.

A fax transmission key 504 is a key for instructing the MFP 103 to transmit a fax. When the fax transmission key 504 is pressed after the settings in the setting fields 501 to 503 are completed, the tablet terminal 101 and the MFP 103 start communicating with each other.

Figure 6:
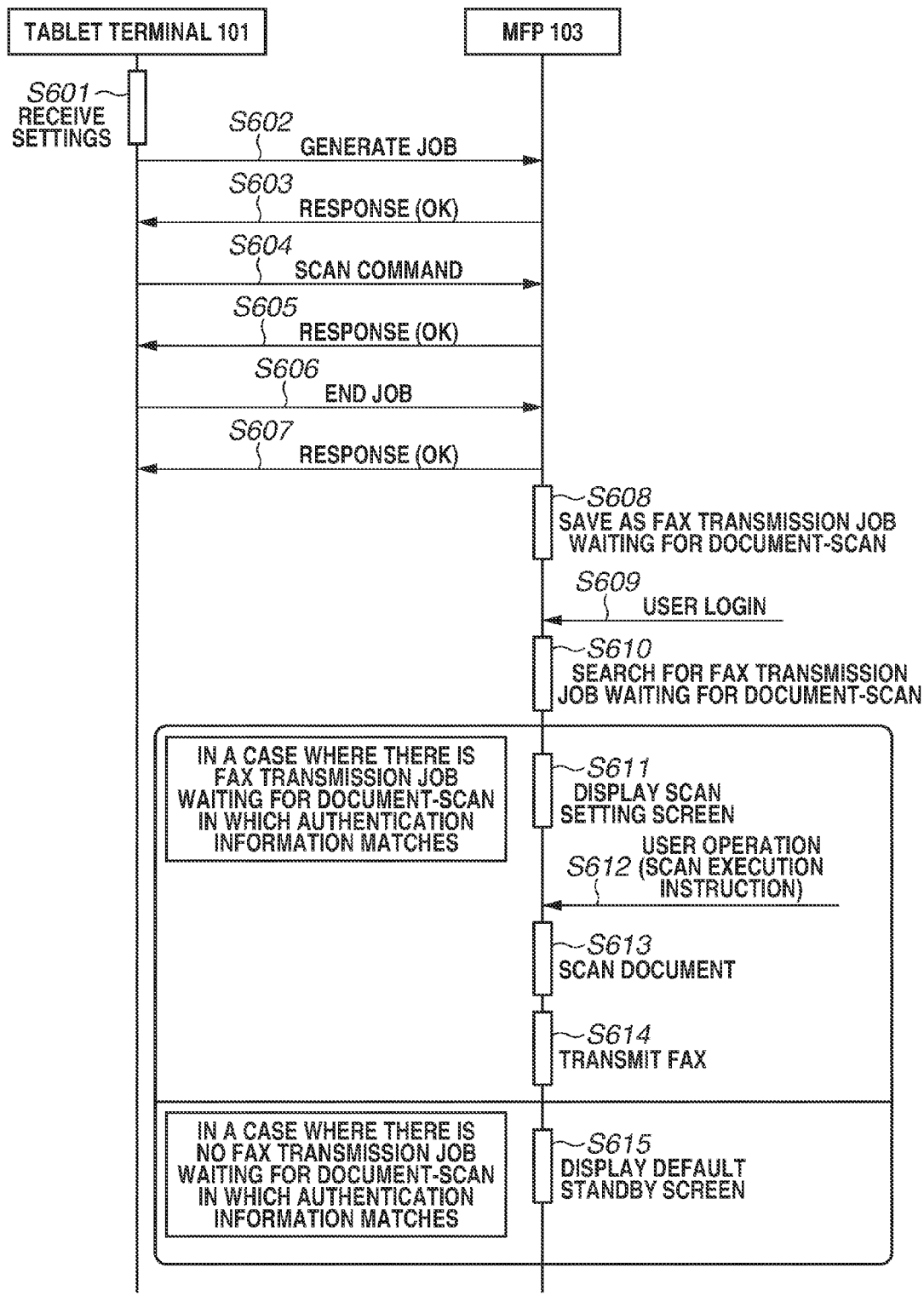
FIG. 6 is a sequence diagram (part 1) illustrating an example of processing of the image processing system.
Figure 7:
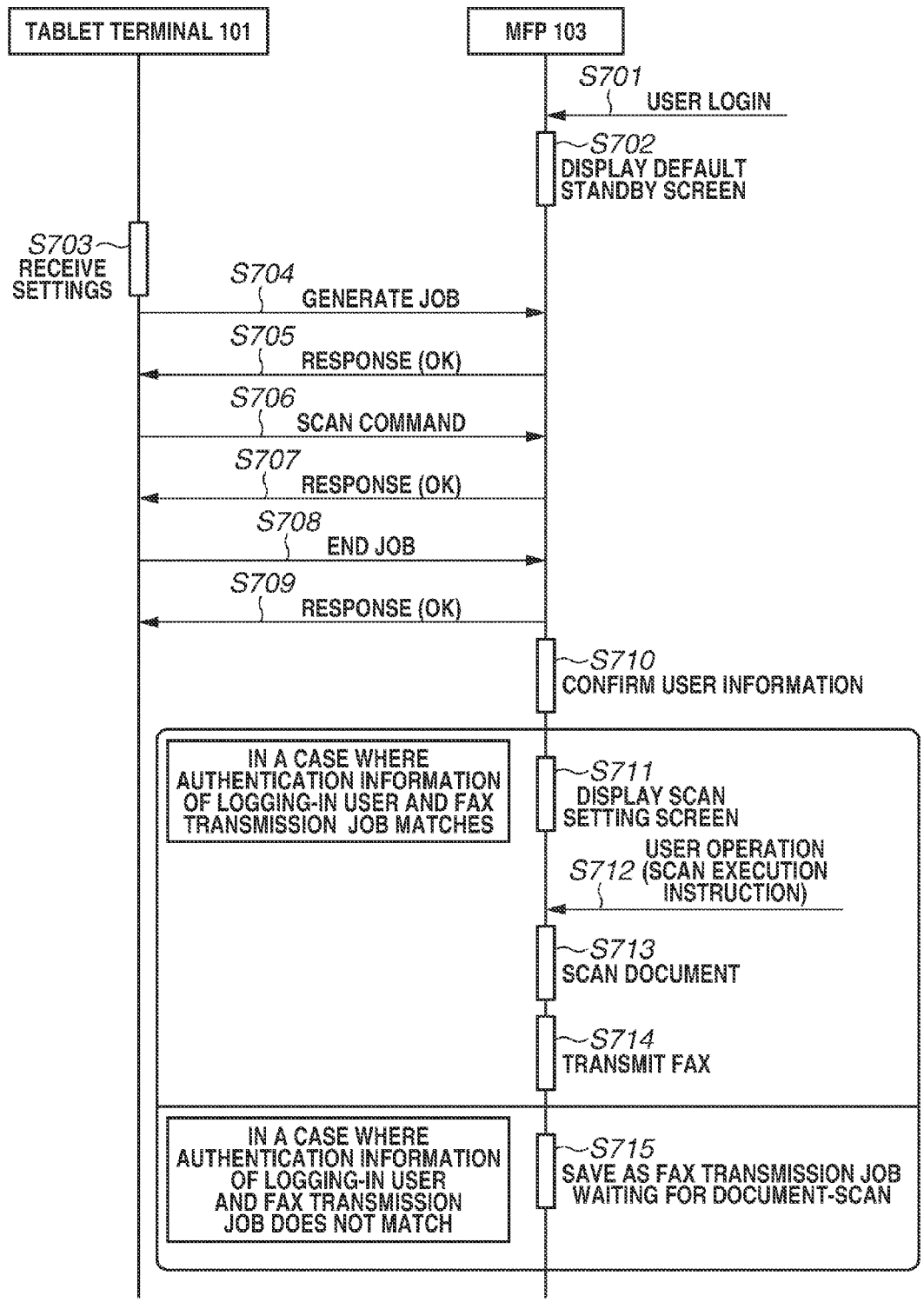
FIG. 7 is a sequence diagram (part 2) illustrating an example of processing of the image processing system.

With reference to FIGS. 6 and 7, the sequence of the processing of the tablet terminal 101 and the MFP 103 is described.

FIG. 6 is a sequence diagram illustrating an example of the processing in a case where the user logs into the MFP 103 after the tablet terminal 101 instructs the MFP 103 to transmit a fax. Specifically, a description is given of the processing in a case where the user logs into the MFP 103 after the MFP 103 receives a document scan/transmission job from the tablet terminal 101. The document scan/transmission job refers to a fax transmission job including a scan command. In step S601, the tablet terminal 101 receives settings from the user through the operation screen of the tablet terminal 101 in FIG. 5. In step S602, the tablet terminal 101 transmits to the MFP 103 a command for generating a job. Authentication information of the user operating the tablet terminal 101 is added to this command. When this command is received, in step S603, the MFP 103 returns "OK" to the tablet terminal 101.

In step S604, the tablet terminal 101 transmits to the MFP 103 a scan command for instructing the MFP 103 to execute a scan. When this command is received, in step S605, the MFP 103 returns "OK" to the tablet terminal 101. In step S606, the tablet terminal 101 transmits to the MFP 103 a command for ending the job. When this command is received, in step S607, the MFP 103 returns "OK" to the tablet terminal 101. In step S608, the MFP 103 saves the job received in steps S602 to S607, as a fax transmission job waiting for a document scan and waits until the user performs a login operation through the operation unit 220.

When the login operation is received from the user in step S609, in step S610, the MFP 103 determines whether there is a fax transmission job waiting for a document scan in which authentication information matches authentication information of the logging-in user. If there is a fax transmission job waiting for a document scan in which authentication information matches the authentication information of the logging-in user, then in step S611, the MFP 103 displays a scan setting screen regarding the fax transmission job waiting for a document scan on the display unit of the operation unit 220 and waits until the user performs an operation. The process of step S611 is an example of a setting screen display process. If the user gives a scan execution instruction in step S612, then in step S613, the MFP 103 performs a document scanning process using the scanner 222. The scanning process follows the contents set in the setting field 503 in FIG. 5. However, if the contents of the settings are changed on the scan setting screen displayed in step S611, the scanning process follows the changed settings. In step S614, the MFP 103 transmits by fax the image data obtained by the scan executed in step S613. The destination of the fax transmission is the telephone number set in the setting field 502 in FIG. 5. The processes of steps S613 and S614 are an example of an execution for processing a job according to an instruction received through a scan setting screen.

If there is no fax transmission job waiting for a document scan in which authentication information matches the authentication information of the logging-in user in step S610, then in step S615, the MFP 103 displays a default standby screen (e.g., a copy function screen) of the MFP 103 on the display unit of the operation unit 220. The process of step S615 is an example of a standby screen display process.

FIG. 7 is a sequence diagram illustrating an example of the processing in a case where the user has already logged into the MFP 103 before the tablet terminal 101 instructs the MFP 103 to transmit a fax. Specifically, a description is given of the processing in a case where the user logs into the MFP 103 before the MFP 103 receives a document scan/transmission job from the tablet terminal 101. When a login operation is received from the user in step S701, in step S702, the MFP 103 displays a default standby screen of the MFP 103 on the display unit of the operation unit 220. In steps S703 to S709, the tablet terminal 101 gives the MFP 103 a fax transmission instruction including a scan command. The sequence of steps S703 to S709, however, is similar to that described in steps S601 to S607 in FIG. 6 and therefore is not described here.

In step S710, the MFP 103 determines whether authentication information of the logging-in user of the MFP 103 matches authentication information of the instructed fax transmission job. If the authentication information matches, then in step S711, the MFP 103 waits for the scanner 222 to become usable, displays a scan setting screen regarding the fax transmission job on the display unit of the operation unit 220, and waits until the user performs an operation. If the user gives a scan execution instruction in step S712, then in steps S713 and S714, the MFP 103 scans a document and transmits a fax. These operations, however, are similar to those of steps S613 and S614 in FIG. 6 and therefore are not described here.

If the authentication information does not match in step S710, then in step S715, the MFP 103 saves the job received in steps S703 to S709, as a fax transmission job waiting for a document scan. The process of step S715 is an example of a process for holding the job received in steps S703 to S709, in a state of waiting to be executed.

As described above, if the tablet terminal 101 gives an instruction to execute a fax transmission job including a scan command, and if authentication information of the fax transmission job and authentication information of the logging-in user of the MFP 103 match each other, a scan setting screen is displayed on the operation unit 220 of the MFP 103. Then, according to a scan execution instruction from the user, the process in which the MFP 103 scans a document and transmits the obtained image data by fax is performed. Hereinafter, the process in which the MFP 103 scans a document and transmits the obtained image data by fax is referred to as a "first transmission process". In the first transmission process, image data obtained by a scan executed by the MFP 103 is transmitted by fax. Next, a description is given of a second transmission process, in which the MFP 103 transmits, by fax, image data prepared on the tablet terminal 101 side.

Figure 8:
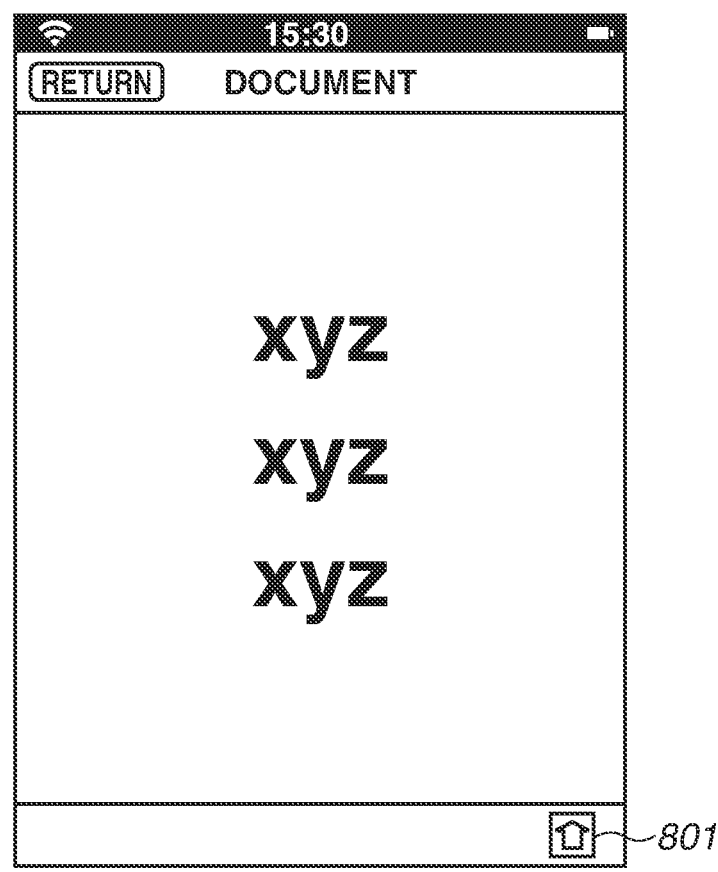
FIG. 8 is a diagram (part 2) illustrating an example of an operation screen of the tablet terminal.

FIG. 8 is a diagram illustrating an example of an operation screen of a data management application displayed on the tablet terminal 101. The tablet terminal 101 stores image data downloaded from a network and image data captured using a camera function provided in the tablet terminal 101. These pieces of image data can be sequentially switched and displayed using the data management application installed on the tablet terminal 101. The operation screen in FIG. 8 illustrates the state where one of the pieces of stored image data is displayed.

If the user presses an operation key 801 on the operation screen in FIG. 8, a screen for selecting a function to be executed for the currently displayed image data appears. On this screen, in addition to an email transmission application and a print application, the above fax transmission application is displayed as a selection candidate. If the user selects the fax transmission application, the screen switches to an operation screen in FIG. 9.

Figure 9:
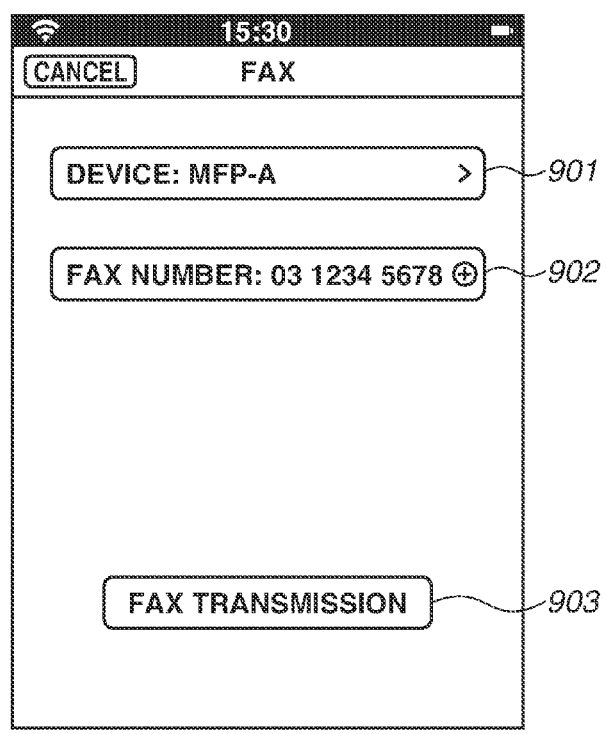
FIG. 9 is a diagram (part 3) illustrating an example of an operation screen of the tablet terminal.

FIG. 9 is a diagram illustrating an example of an operation screen of the fax transmission application displayed on the tablet terminal 101. Setting fields 901, 902, and 903 are similar to the setting fields 501, 502, and 504, respectively, which have been described in FIG. 5.

Figure 10:
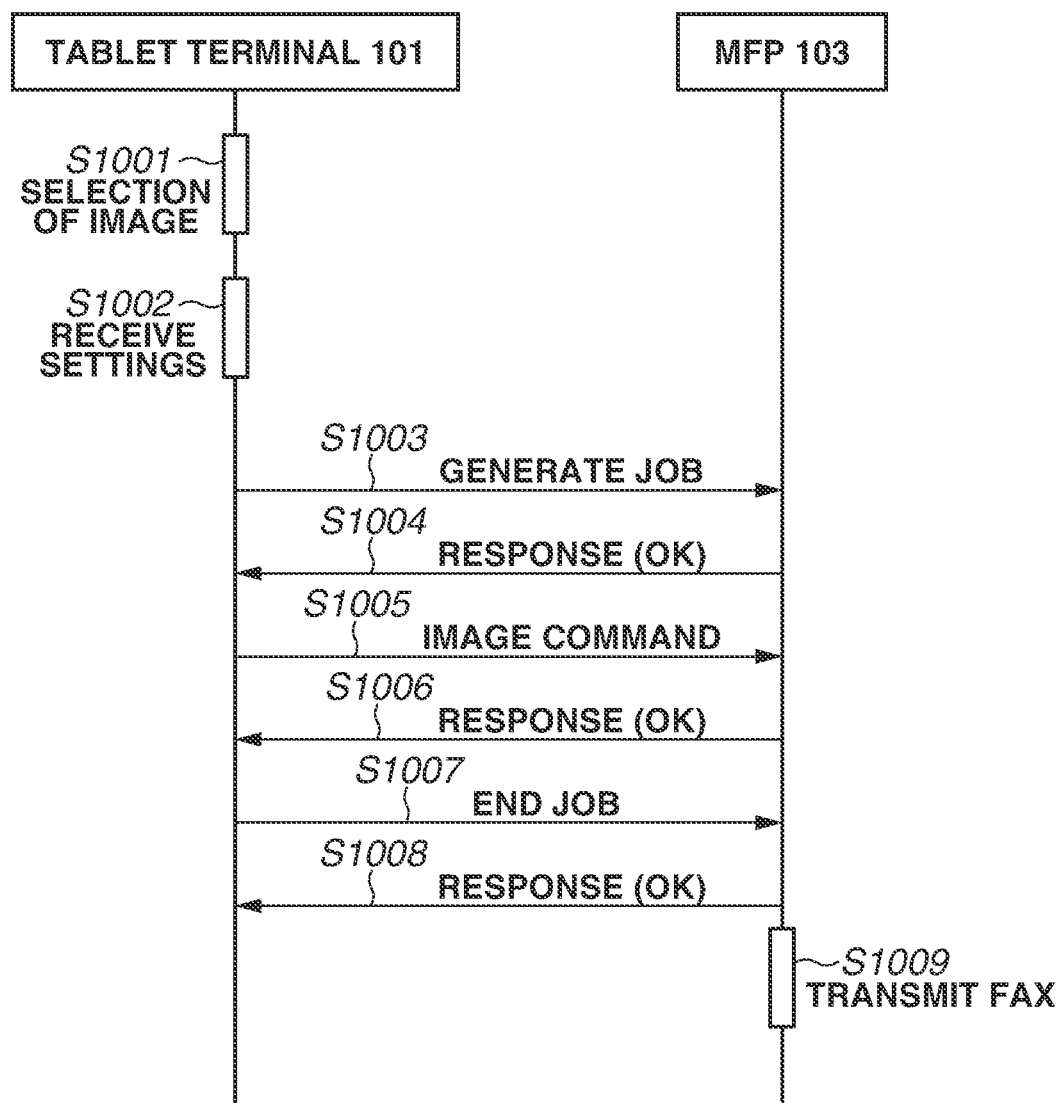
FIG. 10 is a sequence diagram (part 3) illustrating an example of processing of the image processing system.

FIG. 10 is a sequence diagram illustrating an example of the processing in a case where the second transmission process is executed. In step S1001, the tablet terminal 101 receives the selection of an image from the user through the operation screen in FIG. 8. In step S1002, the tablet terminal 101 receives settings from the user through the operation screen in FIG. 9. In step S1003, the tablet terminal 101 transmits to the MFP 103 a command for generating a job. When this command is received, then in step S1004, the MFP 103 returns "OK" to the tablet terminal 101.

In step S1005, the tablet terminal 101 transmits an image command to the MFP 103. The image command includes image data to be transmitted by fax from the MFP 103. This image data is what has been displayed on the operation screen in FIG. 8. When the image command is received, then in step S1006, the MFP 103 returns "OK" to the tablet terminal 101. In step S1007, the tablet terminal 101 transmits to the MFP 103 a command for ending the job. When this command is received, then in step S1008, the MFP 103 returns "OK" to the tablet terminal 101. In step S1009, the MFP 103 transmits by fax the image data received from the tablet terminal 101. The destination of the fax transmission is the telephone number set in the setting field 902.

As described above, according to the contents set in the tablet terminal 101, the process in which the MFP 103 transmits by fax image data transmitted from the tablet terminal 101 to the MFP 103 (the second transmission process) is performed. In the second transmission process, a scanning process is not executed on the MFP 103 side. Thus, unlike the first transmission process, it is not necessary to wait for the user to operate the MFP 103, and a fax transmission process is executed regardless of whether the user logs in to the MFP 103.

Figure 11:
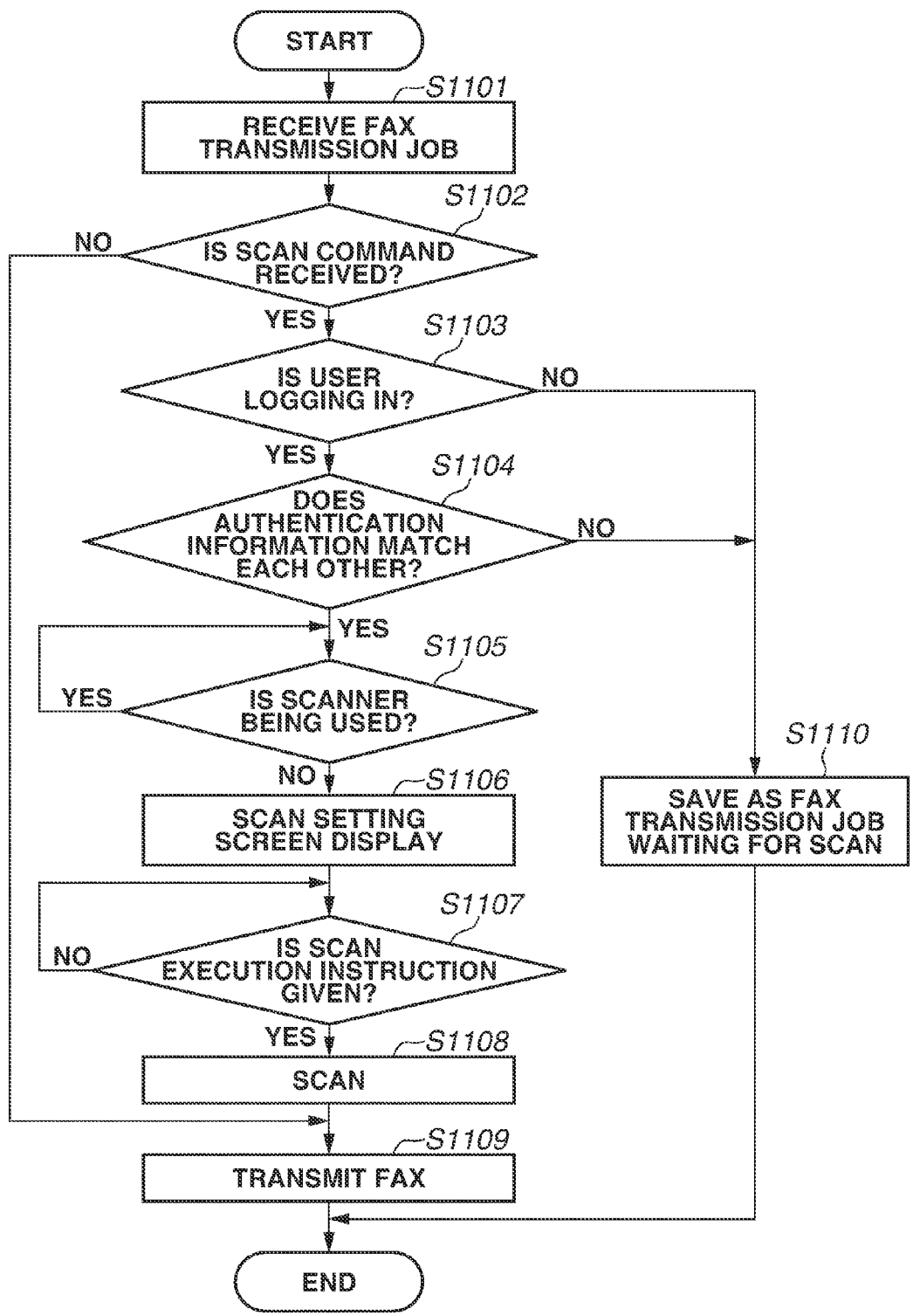
FIG. 11 is a flowchart (part 1) illustrating an example of processing of the MFP.
Figure 12:
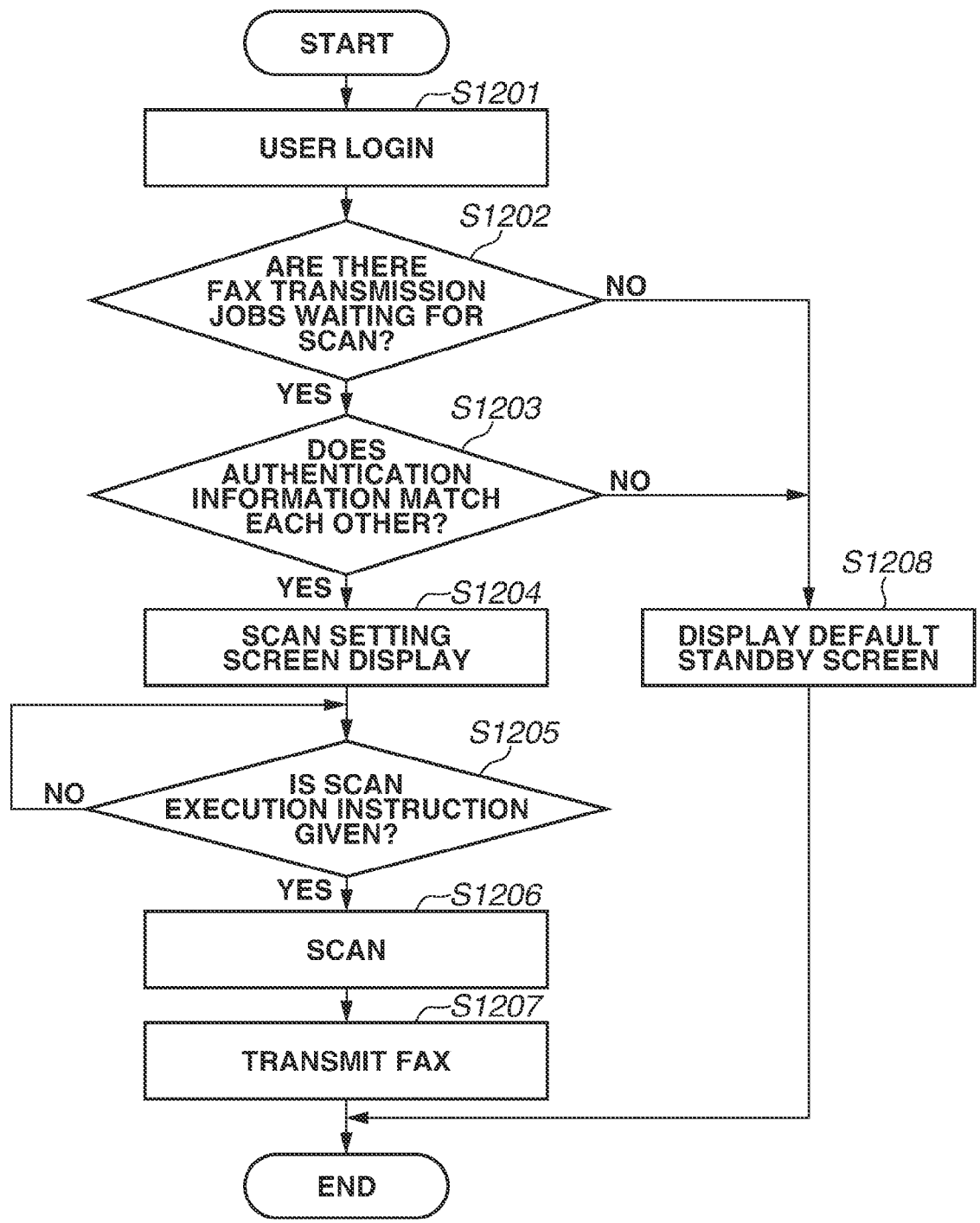
FIG. 12 is a flowchart (part 2) illustrating an example of processing of the MFP.

FIGS. 11 and 12 are flowcharts illustrating examples of the processing of the MFP 103. Each operation (the process of each step) illustrated in the flowcharts in FIGS. 11 and 12 is achieved by the CPU 211 of the control unit 210 executing a control program stored in the ROM 212. FIG. 11 is a flowchart illustrating an example of the processing when the MFP 103 receives a fax transmission job from the tablet terminal 101. When a fax transmission job is received in step S1101, then in step S1102, the job controller unit 302 determines the content of an instruction in the fax transmission job. More specifically, if an image command is received, the job controller unit 302 determines that an instruction to transmit by fax image data transmitted from the tablet terminal 101 (the second transmission process) has been given, and the processing proceeds to step S1109. Then, the fax unit 305 transmits by fax the image data transmitted from the tablet terminal 101.

If, on the other hand, a scan command is received, the job controller unit 302 determines that an instruction to transmit by fax image data obtained by the scan executed by the MFP 103 (the first transmission process) has been given, and the processing proceeds to step S1103.

In step S1103, the authentication unit 309 determines whether the user is logging in the MFP 103. If the MFP 103 is in a user logging-in state, the processing proceeds to step S1104. If not, the processing proceeds to step S1110. In step S1104, the job controller unit 302 determines whether authentication information of the logging-in user of the MFP 103 and authentication information of the fax transmission job match each other. If the authentication information matches in step S1104, the processing proceeds to step S1105. If not, the processing proceeds to step S1110. In step S1105, the MFP 103 waits until the scanner 222 becomes usable. In step S1110, the job controller unit 302 saves the fax transmission job as a fax transmission job waiting for a scan.

If the scanner 222 becomes usable in step S1105, then in step S1106, the UI unit 301 displays a scan setting screen regarding the fax transmission job on the display unit of the operation unit 220 and waits until the user performs an operation in step S1107. If the user gives a scan execution instruction in step S1107, then in step S1108, the scan unit 306 performs a document scanning process using the scanner 222. In step S1109, the fax unit 305 transmits by fax the image data obtained by the scan executed in step S1108.

FIG. 12 is a flowchart illustrating an example of the processing when the user logs in to the MFP 103. In step S1201, the UI unit 301 receives a login operation from the user through the operation unit 220. Next, in step S1202, the job controller unit 302 determines whether there is a fax transmission job waiting for a scan. If it is determined that there is the fax transmission job waiting for a scan, the processing proceeds to step S1203. If not, the processing proceeds to step S1208. In step S1203, the job controller unit 302 determines whether among the fax transmission job waiting for a scan, there is a fax transmission job waiting for a scan in which authentication information matches authentication information of the logging-in user of the MFP 103. If there is a fax transmission job waiting for a scan in which authentication information matches the authentication information of the logging-in user of the MFP 103, the processing proceeds to step S1204. If not, the processing proceeds to step S1208. In step S1208, the UI unit 301 displays a default standby screen of the MFP 103.

In step S1204, the UI unit 301 displays on the display unit of the operation unit 220 a scan setting screen regarding the fax transmission job waiting for a scan in which the authentication information matches the authentication information of the logging-in user of the MFP 103. Then, the UI unit 301 waits until the user performs an operation in step S1205. If the user gives a scan execution instruction in step S1205, then in step S1206, the scan unit 306 performs a document scanning process using the scanner 222. In step S1207, the fax unit 305 transmits by fax the image data obtained by the scan executed in step S1206.

Figure 13:
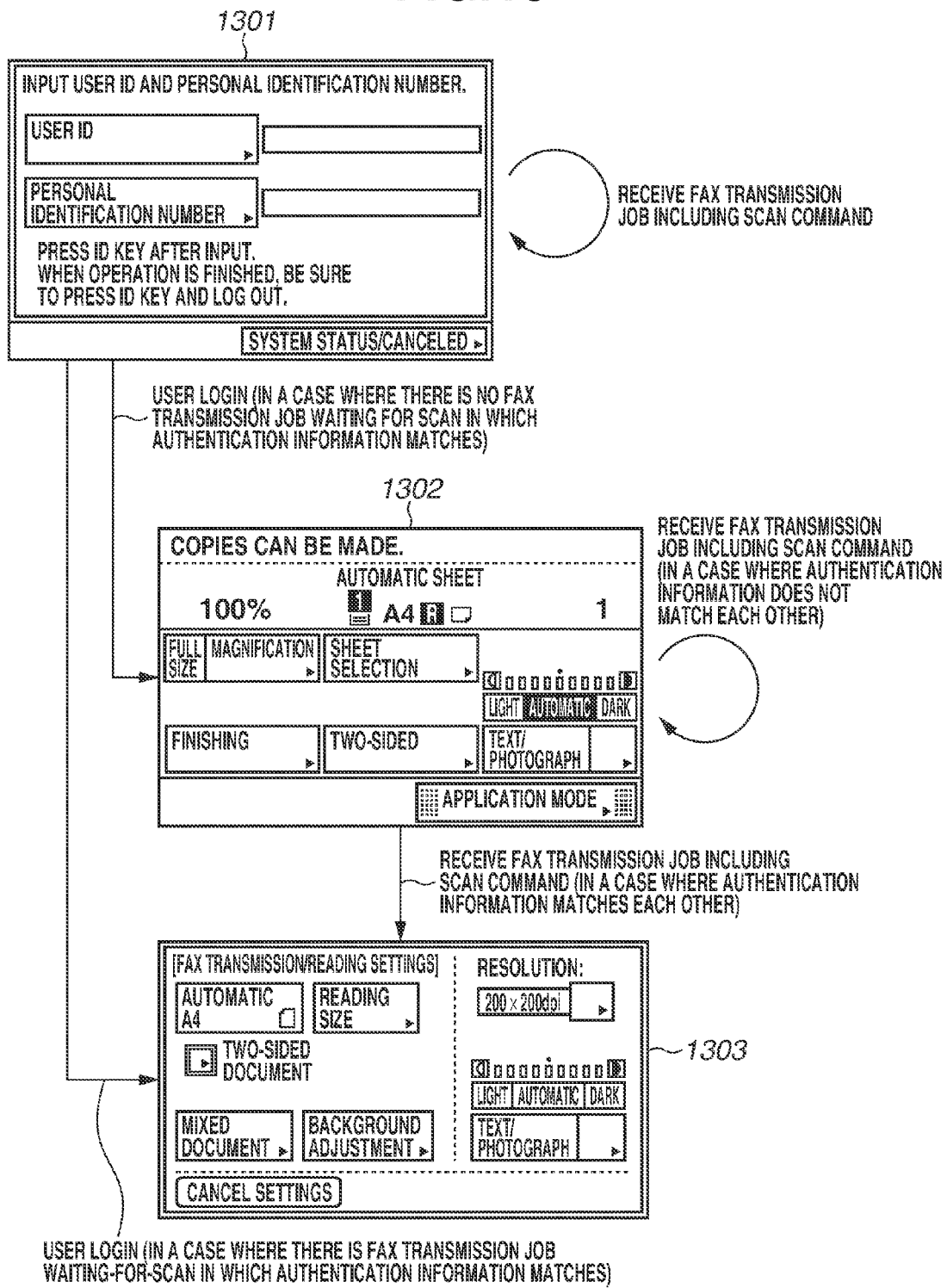
FIG. 13 is a diagram (part 1) illustrating examples of display screens of the MFP.

FIG. 13 is a diagram illustrating examples of screens displayed on the operation unit 220 of the MFP 103. In FIG. 13, a screen 1301 is a login screen of the MFP 103. To use the MFP 103, the user performs a login operation (user authentication) by inputting a user identification (ID) and a password through the screen 1301. At this time, if the MFP 103 receives a fax transmission job including a scan command before the user performs the login operation, the received job is saved as a fax transmission job waiting for a scan, and the display screen does not transition from the screen 1301. If the user performs the login operation on the screen 1301, the display screen transitions to a screen 1302 or a screen 1303. The screen 1302 is a default standby screen of the MFP 103 to be displayed in a case where there is no fax transmission job waiting for a scan in which authentication information matches authentication information of the logging-in user of the MFP 103.

The screen 1303 is a scan setting screen to be displayed in a case where there is a fax transmission job waiting for a scan in which authentication information matches the authentication information of the logging-in user of the MFP 103. On the screen 1303, it is possible to change scan settings regarding the fax transmission job. If the user gives a scan execution instruction (for example, presses a start key of the operation unit 220) in the state where the screen 1303 is displayed, the MFP 103 scans a document using the scanner 222 and transmits the obtained image data by fax. If the MFP 103 receives a fax transmission job including a scan command after the user logs in to the MFP 103, and if authentication information of the received job matches authentication information of the logging-in user of the MFP 103, the display screen transitions from the screen 1302 to the screen 1303. Then, the user can give a scan execution instruction in a similar manner.

As described above, in the first exemplary embodiment, only if the tablet terminal 101 gives an instruction to transmit by fax image data obtained by a scan executed by the MFP 103 (the first transmission process), and if authentication information of the logging-in user of the MFP 103 and authentication information of this fax transmission job match each other, a scan setting screen regarding the fax transmission job is displayed on the display unit of the operation unit 220. Then, according to an instruction from the user, a document is scanned, and the image data obtained by the scan is transmitted by fax.

Consequently, even if a plurality of users use an image processing apparatus in a shared manner, it is possible to certainly execute a document scan/transmission job, regardless of the state of use of an image processing system by another user, and it is also possible to prevent erroneous transmission of a document due to almost simultaneous submission of a plurality of jobs.

Next, a second exemplary embodiment of the present invention is described. In the first exemplary embodiment, a description has been given of an exemplary embodiment in a case where user authentication is enabled in the MFP 103. In the second exemplary embodiment, a description is given of an exemplary embodiment in a case where user authentication is disabled in the MFP 103, or the MFP 103 does not have a user authentication function.

Figure 14:
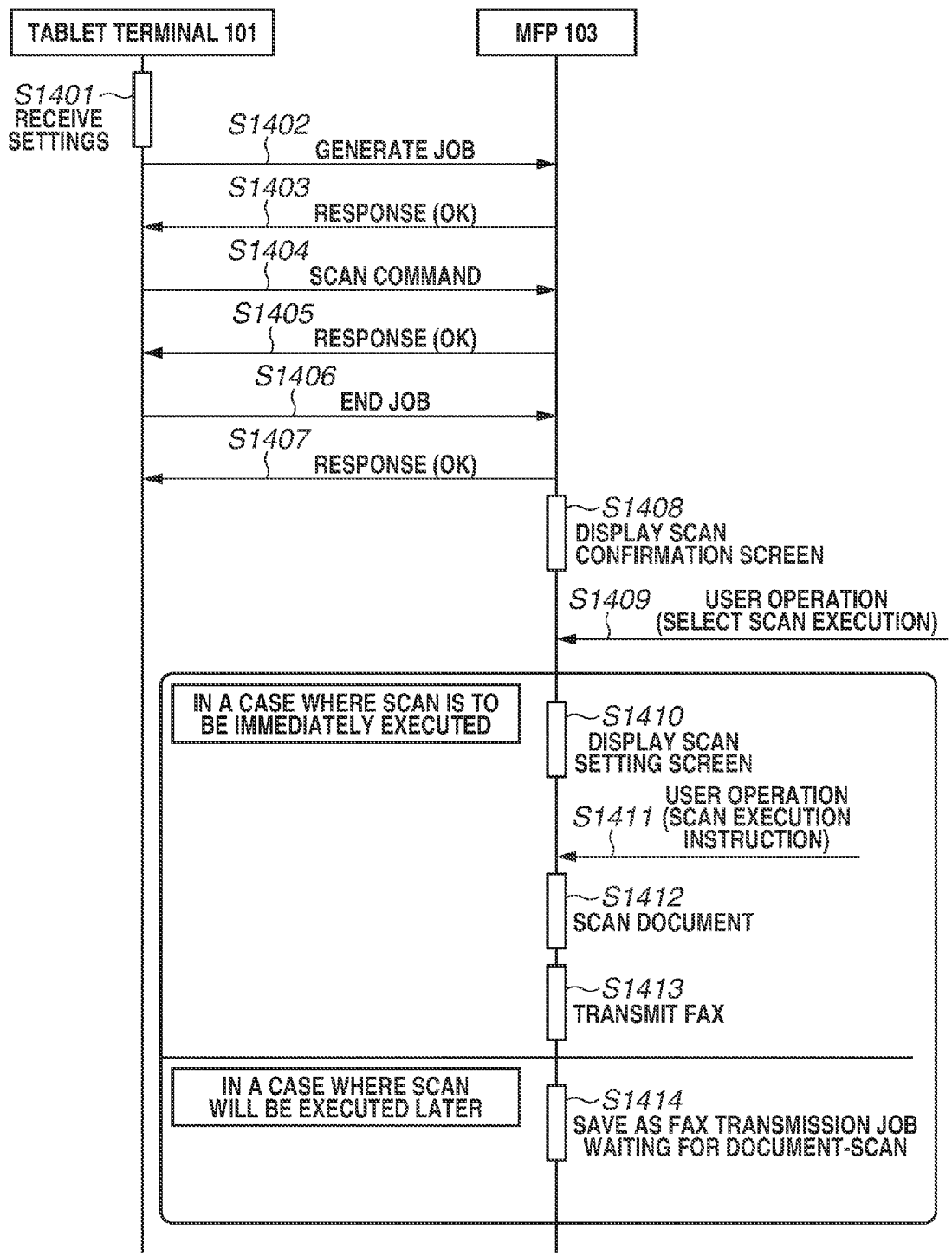
FIG. 14 is a sequence diagram (part 4) illustrating an example of processing of the image processing system.

FIG. 14 is a sequence diagram illustrating an example of the processing of the tablet terminal 101 and the MFP 103 in the second exemplary embodiment. In steps S1401 to S1407, the tablet terminal 101 gives the MFP 103 a fax transmission instruction including a scan command. The sequence of steps S1401 to S1407, however, is similar to that described in steps S601 to S607 in FIG. 6 in the first exemplary embodiment and therefore is not described here.

In step S1408, the MFP 103 waits for the scanner 222 to become usable and displays on the display unit of the operation unit 220 a scan confirmation screen (a selection screen), which allows the user to select whether to immediately execute a document scanning process regarding the fax transmission job. Then, the MFP 103 waits until the user performs an operation. The process of step S1408 is an example of a selection screen display process. If the user gives an instruction to immediately execute a scanning process in step S1409, then in step S1410, the MFP 103 displays a scan setting screen regarding the fax transmission job on the display unit of the operation unit 220 and waits until the user performs an operation.

If the user gives a scan execution instruction in step S1411, then in step S1412, the MFP 103 performs a document scanning process using the scanner 222. This process follows the contents set in the setting field 503 in FIG. 5. However, if the contents of the settings are changed on the scan setting screen displayed in step S1410, the process follows the settings after the changes. In step S1413, the MFP 103 transmits by fax the image data obtained by the scan executed in step S1412. The destination of the fax transmission is the telephone number set in the setting field 502 in FIG. 5. If the user gives an instruction not to immediately execute a scanning process (an instruction to execute a scanning process later) in step S1409, then in step S1414, the MFP 103 saves the job received in steps S1401 to S1407, as a fax transmission job waiting for a document scan.

As described above, in a case where a user authentication function is not implemented in the MFP 103, and if the tablet terminal 101 gives the MFP 103 an instruction to execute a fax transmission job including a scan command, a scan confirmation screen for selecting whether to immediately execute a document scanning process regarding the fax transmission job is displayed on the operation unit 220 of the MFP 103. Then, only if the user makes a selection and gives an instruction to immediately execute a scanning process, the process in which the MFP 103 scans a document and transmits the obtained image data by fax is performed.

Also in the second exemplary embodiment, it is possible to execute the second transmission process, in which the MFP 103 transmits by fax image data prepared on the tablet terminal 101 side. As described above in the first exemplary embodiment, in the second transmission process, a fax transmission process is executed without requiring the user to perform an operation on the MFP 103. Thus, the sequence of the processing of the tablet terminal 101 and the MFP 103 is similar to that in the first exemplary embodiment and therefore is not described here.

Figure 15:
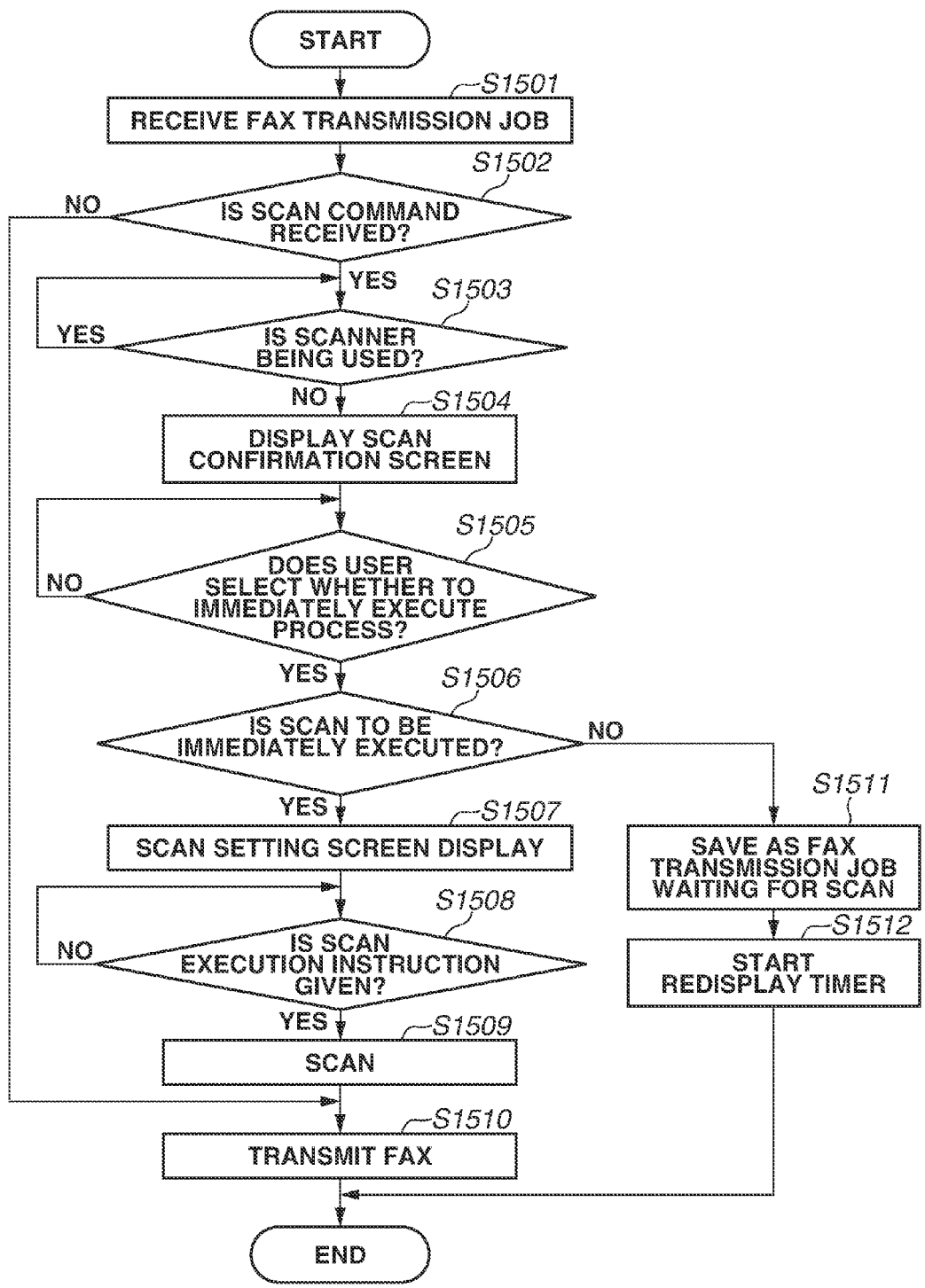
FIG. 15 is a flowchart (part 3) illustrating an example of processing of the MFP.

FIG. 15 is a flowchart illustrating an example of the processing of the MFP 103 in the second exemplary embodiment. Each operation (the process of each step) illustrated in the flowchart in FIG. 15 is achieved by the CPU 211 of the control unit 210 executing a control program stored in the ROM 212.

When a fax transmission job is received in step S1501, then in step S1502, the job controller unit 302 determines the content of an instruction in the fax transmission job. More specifically, if an image command is received, the job controller unit 302 determines that an instruction to transmit by fax image data transmitted from the tablet terminal 101 (the second transmission process) has been given, and the processing proceeds to step S1510. Then, the fax unit 305 transmits by fax the image data transmitted from the tablet terminal 101. If, on the other hand, a scan command is received, the job controller unit 302 determines that an instruction to transmit by fax image data obtained by a scan executed by the MFP 103 (the first transmission process) has been given, and the processing proceeds to step S1503.

In step S1503, the MFP 103 waits until the scanner 222 becomes usable. Then, if the scanner 222 becomes usable, then in step S1504, the UI unit 301 displays on the operation unit 220 of the MFP 103 a scan confirmation screen for selecting whether to immediately execute a document scanning process regarding the fax transmission job, and waits until the user performs an operation in step S1505. If the user selects whether to immediately execute a document scanning process in step S1505, then in step S1506, the MFP 103 confirms the content of an instruction of the selection. If an instruction to immediately execute a scanning process has been given, the processing proceeds to step S1507. If an instruction not to immediately execute a scanning process (an instruction to execute a scanning process later) has been given, the processing proceeds to step S1511.

In step S1507, the UI unit 301 displays a scan setting screen regarding the fax transmission job on the display unit of the operation unit 220 and waits until the user performs an operation in step S1508. If the user gives a scan execution instruction in step S1508, then in step S1509, the scan unit 306 performs a document scanning process using the scanner 222. In step S1510, the fax unit 305 transmits by fax the image data obtained by the scan executed in step S1509.

In step S1511, the job controller unit 302 saves the fax transmission job as a fax transmission job waiting for a scan. In step S1512, the UI unit 301 starts a redisplay timer for the scan confirmation screen regarding the job. From then on, the UI unit 301 redisplays the scan confirmation screen regarding the job at the time the redisplay timer expires. That is, the time elapsed since the instruction not to immediately execute a scanning process (the instruction to execute a scanning process later) is given through the scan confirmation screen, is measured using the redisplay timer. If a predetermined time elapses, the scan confirmation screen is displayed again.

FIG. 16 is a flowchart illustrating an example of the processing regarding the fax transmission job waiting for a scan saved in step S1511 in FIG. 15. Each operation (the process of each step) illustrated in the flowchart in FIG. 16 is achieved by the CPU 211 of the control unit 210 executing a control program stored in the ROM 212.

First, in step S1601, the job controller unit 302 determines whether there is a job saved as a fax transmission job waiting for a scan. If there is a fax transmission job waiting for a scan, the processing proceeds to step S1602. If not, the processing returns to step S1601. In step S1602, the job controller unit 302 determines whether a redisplay timer for a scan confirmation screen regarding the fax transmission job waiting for a scan expires (whether the predetermined time has elapsed). If the redisplay timer expires, the processing proceeds to step S1603. If not, the processing returns to step S1601.

In step S1603, the MFP 103 waits until the scanner 222 becomes usable. If the scanner 222 becomes usable, then in step S1604, the UI unit 301 redisplays on the operation unit 220 of the MFP 103 the scan confirmation screen for selecting whether to immediately execute a document scanning process regarding the job, and waits until the user performs an operation in step S1605. If the user selects whether to immediately execute a document scanning process in step S1605, then in step S1606, the MFP 103 confirms the content of an instruction of the selection. If an instruction to immediately execute a scanning process is given, the processing proceeds to step S1607. If an instruction not to immediately execute a scanning process (an instruction to execute a scanning process later) is given, the processing proceeds to step S1611.

In steps S1607 to S1610, a document scanning process and a fax transmission process regarding the job are executed according to an operation of the user. The processes of steps S1607 to S1610, however, are similar to those of steps S1507 to S1510 described with reference to the flowchart in FIG. 15 and therefore are not described here.

In step S1611, the UI unit 301 starts the redisplay timer for the scan confirmation screen regarding the job again, and the processing returns to step S1601.

FIG. 17 is a diagram illustrating examples of screens displayed on the operation unit 220 of the MFP 103 in the second exemplary embodiment. In FIG. 17, a screen 1701 is a default standby screen of the MFP 103. If the MFP 103 receives a fax transmission job including a scan command in the state where the screen 1701 is displayed, the display screen transitions to a screen 1702. The screen 1702 is a scan confirmation screen for selecting whether to immediately execute a document scanning process regarding the fax transmission job. If the user gives an instruction to immediately execute a scanning process on the screen 1702, the display screen transitions to a screen 1703. If the user gives an instruction not to immediately execute a scanning process (an instruction to execute a scanning process later), the display screen transitions to a screen 1704.

The screen 1703 is a scan setting screen. On the screen 1703, it is possible to change scan settings regarding the fax transmission job. If the user gives a scan execution instruction (for example, presses the start key of the operation unit 220) in the state where the screen 1703 is displayed, the MFP 103 scans a document using the scanner 222 and transmits the obtained image data by fax. The screen 1704 is the screen displayed immediately before the screen 1702 is displayed. If the user gives an instruction not to immediately execute a scanning process (an instruction to execute a scanning process later) on the screen 1702, and the display screen transitions to the screen 1704, then as described above with reference to the flowchart in FIG. 16, the display screen transitions to the screen 1702 again when the redisplay timer expires. Then, similar processing is repeated.

As described above, in the second exemplary embodiment, if the tablet terminal 101 gives an instruction to transmit by fax image data obtained by a scan executed by the MFP 103 (the first transmission process), a scan confirmation screen (a selection screen) for selecting whether to immediately execute a document scanning process regarding this fax transmission job is displayed. Then, only if the user gives an instruction to immediately execute a document scanning process, a scan setting screen regarding the fax transmission job is displayed on the display unit of the operation unit 220. Then, according to an instruction from the user, a document is scanned, and the image data obtained by the scan is transmitted by fax. Based on these configurations, even if user authentication is not enabled in the MFP 103, it is possible to certainly execute a document scan/transmission job, regardless of the state of use of the MFP 103 by another user. This improves the usability of the user.

Other Exemplary Embodiments

The present invention can also be achieved by the process of supplying a program for achieving one or more functions of the above exemplary embodiments to a system or an apparatus via a network or a storage medium, and causing one or more processors of a computer of the system or the apparatus to read and execute the program. Alternatively, the present invention can also be achieved by a circuit (e.g., an application-specific integrated circuit (ASIC)) for achieving one or more functions.

According to each of the above exemplary embodiments, it is possible to provide a mechanism for, even if a plurality of users uses an image processing apparatus in a shared manner, certainly executing a document scan/transmission job, regardless of the state of use of the image processing apparatus by another user.

While the desirable exemplary embodiments of the present invention have been described in detail, the present exemplary embodiments are not limited to such particular exemplary embodiments, but can be modified and changed in various manners within the scope of the present invention described in the appended claims.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-250966, filed Dec. 11, 2014, which is hereby incorporated by reference herein in its entirety.

What is claimed is:

1. An image processing apparatus capable of communicating with an information processing apparatus, the image processing apparatus comprising:
   a scanner device that scans a document to generate image data;
   at least one processor which acts as:
      a login unit configured to authenticate a user of the image processing apparatus, and allow the user to log in to the image processing apparatus in accordance with success in authenticating the user, wherein in a case where the user logs in to the image processing apparatus through the login unit, the image processing apparatus is shifted into a state where the user is able to use a function of the image processing apparatus via an operation unit;
      a reception unit configured to receive, from the information processing apparatus, a destination for a transmission destination of the image data generated by the scanner device, and information related to a user to transmit the destination, wherein the destination and the information are transmitted from the information processing apparatus after the user logs in to the image processing apparatus through the login unit;
      a determination unit configured to determine, in accordance with the reception unit receiving the information related to the user to transmit the destination, whether a user corresponding to the received information related to the user to transmit the destination matches a user who has logged in to the image processing apparatus, since before the information is received, through the login unit;
      a display control unit configured to display a setting screen on the operation unit, in accordance with a determination by the determination unit that the user corresponding to the received information related to the user to transmit the destination matches the user who has logged in to the image processing apparatus, since before the information is received, through the login unit, wherein the setting screen is a screen related to execution of scan and transmission processes using the received destination; and
      an execution unit configured to execute the scan and transmission processes based on reception of a predetermined user's operation.

2. The image processing apparatus according to claim 1, wherein the display control unit displays a standby screen on the operation unit in a case where the user has logged in to the image processing apparatus after the destination is received, and in a case where the determination unit determines that the user corresponding to the received information related to the user to transmit the destination does not match the user who has logged in to the image processing apparatus, since before the information is received, through the login unit.

3. The image processing apparatus according to claim 1, wherein the reception unit receives from the information processing apparatus setting information including at least the destination and the information related to the user identification, and wherein the at least one processor further acts as:
a holding unit configured to, in a case where the user has logged in to the image processing apparatus after the setting information is received, and in a case where the determination unit determines that the user corresponding to the received information related to the user to transmit the destination does not match the user who has logged in to the image processing apparatus, since before the information is received, through the login unit, hold the received setting information in a state of standing by for its execution.

4. The image processing apparatus according to claim 1, wherein the reception unit receives from the information processing apparatus at least either setting information including at least the destination and the information related to the user to transmit the destination or transmission information including at least the image data, a destination for a transmission destination of the image data and the information related to the user to transmit the destination, and
wherein in a case where the reception unit receives the transmission information, the execution unit executes a transmission process and transmits the image data to the received destination, regardless of whether the user corresponding to the received information related to the user to transmit the destination matches the user who has logged in to the image processing apparatus, since before the information is received, through the login unit.

5. The image processing apparatus according to claim 1, wherein the display control unit displays the setting screen for receiving a setting regarding the scanning of a document by the scanner device involved in the execution of the scan and transmission processes.

6. The image processing apparatus according to claim 1, wherein, in a case where the determination unit determines that the user corresponding to the received information related to the user to transmit the destination does not match the user who has logged in to the image processing apparatus, since before the information is received, through the login unit, the display control unit performs a control not to display the setting screen based on the received destination.

7. The image processing apparatus according to claim 1, wherein the setting screen displayed by the display control unit is a screen in which a setting regarding the scan and transmission processes is changeable.

8. An image processing method to be executed by an image processing apparatus that is capable of communicating with an information processing apparatus, the image processing apparatus having a scanner device that scans a document to generate image data, the image processing method comprising:
authenticating a user of the image processing apparatus, and allowing the user to log in to the image processing apparatus in accordance with success in authenticating the user, wherein in a case where the user logs in to the image processing apparatus through a login unit, the image processing apparatus is shifted into a state where the user is able to use a function of the image processing apparatus via an operation unit;
receiving, from the information processing apparatus, a destination for a transmission destination of the image data generated by the scanner device, and information related to a user to transmit the destination, wherein the destination and the information are transmitted from the information processing apparatus after the user logs in to the image processing apparatus through the login unit;
determining, in accordance with the receiving the information related to the user to transmit the destination, whether a user corresponding to the received information related to the user to transmit the destination matches a user who has logged in to the image processing apparatus, since before the information is received, through the login unit;
displaying a setting screen on the operation unit, in accordance with determining that the user corresponding to the received information related to the user to transmit the destination matches the user who has logged in to the image processing apparatus, since before the information is received, through the login unit, wherein the setting screen is a screen related to execution of scan and transmission processes using the received destination; and
executing the scan and transmission processes based on reception of a predetermined user's operation.

9. A non-transitory computer-readable storage medium storing instructions that, when executed by a computer of an image processing apparatus that is capable of communicating with an information processing apparatus and has a scanner device that scans a document to generate image data, cause the image processing apparatus to perform a method comprising:
authenticating a user of the image processing apparatus, and allowing the user to log in to the image processing apparatus in accordance with success in authenticating the user, wherein in a case where the user logs in to the image processing apparatus through a login unit, the image processing apparatus is shifted into a state where the user is able to use a function of the image processing apparatus via an operation unit;
receiving, from the information processing apparatus, a destination for a transmission destination of the image data generated by the scanner device, and information related to a user to transmit the destination, wherein the destination and the information are transmitted from the information processing apparatus after the user logs in to the image processing apparatus through the login unit;
determining, in accordance with the receiving the information related to the user to transmit the destination, whether a user corresponding to the received information related to the user to transmit the destination matches a user who has logged in to the image processing apparatus, since before the information is received, through the login unit;
displaying a setting screen on the operation unit, in accordance with determining that the user corresponding to the received information related to the user to transmit the destination matches the user who has logged in to the image processing apparatus, since before the information is received, through the login unit, wherein the setting screen is a screen related to execution of scan and transmission processes using the received destination; and
executing the scan and transmission processes based on reception of a predetermined user's operation.

10. An image processing apparatus capable of communicating with an information processing apparatus, the image processing apparatus comprising:
a scanner device that scans a document to generate image data;

at least one processor which acts as:
- a login unit configured to authenticate a user of the image processing apparatus, and allow the user to log in to the image processing apparatus in accordance with success in authenticating the user, wherein in a case where the user logs in to the image processing apparatus through the login unit, the image processing apparatus is shifted into a state where the user is able to use a function of the image processing apparatus via an operation unit;
- a reception unit configured to receive, from the information processing apparatus, a destination for a transmission destination of the image data generated by the scanner device, and information related to a user to transmit the destination, wherein the destination and the information are transmitted from the information processing apparatus after the user logs in to the image processing apparatus through the login unit;
- a determination unit configured to determine, in accordance with the reception unit receiving the information related to the user to transmit the destination, whether a user corresponding to the received information related to the user to transmit the destination matches a user who has logged in to the image processing apparatus, since before the information is received, through the login unit; and
- an execution unit configured to, in accordance with a determination by the determination unit that the user corresponding to the received information related to the user to transmit the destination matches the user who has logged in to the image processing apparatus, since before the information is received, through the login unit, execute a scan and transmission processes based on the received destination.

11. The image processing apparatus according to claim 10, wherein the determination unit determines that the user corresponding to the received information related to the user to transmit the destination matches the user who has logged in to the image processing apparatus, since before the information is received, through the login unit.

12. The image processing apparatus according to claim 11, wherein, in a case where the determination unit determines that the user corresponding to the received information related to the user to transmit the destination does not match the user who has logged in to the image processing apparatus, since before the information is received, through the login unit, the execution unit performs a control not to execute the scan and transmission processes based on the received destination.

13. The image processing apparatus according to claim 10, wherein the reception unit receives setting information including at least the destination, the information related to the user to transmit the destination, and a scan setting, and
wherein the execution unit executes a scan process based on the received scan setting, and then executes a transmission process to transmit image data obtained by the scan process to the received destination.

14. The image processing apparatus according to claim 13, wherein the received scan setting includes at least a setting regarding a size of a document to be scanned and a setting of a scanning resolution.

15. The image processing apparatus according to claim 10, wherein the information related to the user to transmit the destination is a user ID and a password.

16. An image processing method to be executed by an image processing apparatus that is capable of communicating with an information processing apparatus, the image processing apparatus having a scanner device that scans a document to generate image data, the image processing method comprising:
- authenticating a user of the image processing apparatus, and allowing the user to log in to the image processing apparatus in accordance with success in authenticating the user, wherein in a case where the user logs in to the image processing apparatus through a login unit, the image processing apparatus is shifted into a state where the user is able to use a function of the image processing apparatus via an operation unit;
- receiving, from the information processing apparatus, a destination for a transmission destination of the image data generated by the scanner device, and information related to a user to transmit the destination, wherein the destination and the information are transmitted from the information processing apparatus after the user logs in to the image processing apparatus through the login unit;
- determining, in accordance with the receiving the information related to the user to transmit the destination, whether a user corresponding to the received information related to the user to transmit the destination matches a user who has logged in to the image processing apparatus, since before the information is received, through the login unit; and
- executing, in accordance with determining that the user corresponding to the received information related to the user to transmit the destination matches the user who has logged in to the image processing apparatus, since before the information is received, through the login unit, scan and transmission processes based on the received destination.

* * * * *